Figure 1:
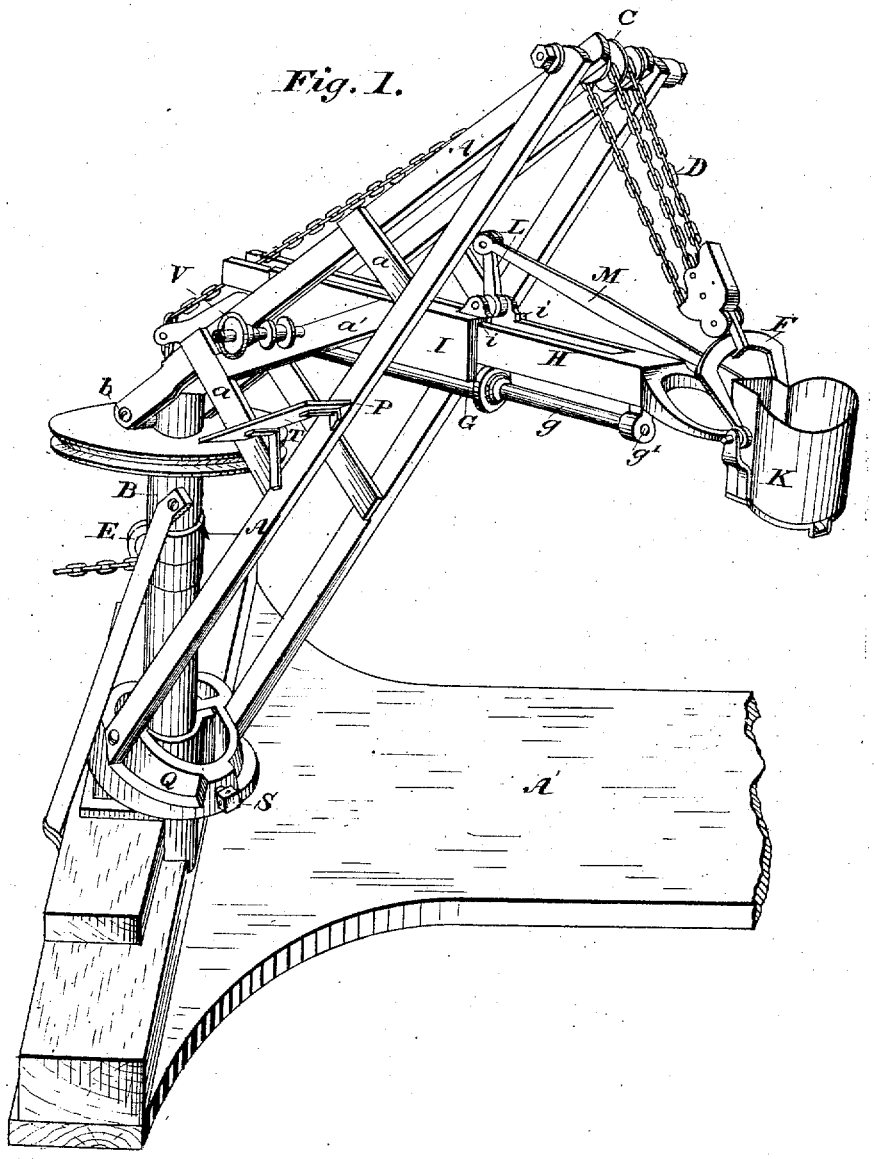

3 Sheets—Sheet 1.

T. DILL,

Assignor to J. CLEMENTS.

Excavating Machine.

No. 9,568. Reissued Feb. 15, 1881.

Witnesses:
A. H. Norris
J. Henry Kaiser

Inventor:
Thomas Dill,
By Geo. H. Lothrop.
Attorney

T. DILL,

Assignor to J. CLEMENTS.

Excavating Machine.

No. 9,568. Reissued Feb. 15, 1881.

Witnesses:
A. H. Norris.
J. Henry Kaiser.

Inventor:
Thomas Dill,
By Geo. H. Lothrop.
Attorney.

T. DILL,

Assignor to J. CLEMENTS.

Excavating Machine.

No. 9,568. Reissued Feb. 15, 1881.

*Witnesses:*
A. H. Norris
J. Henry Kaiser

*Inventor:*
Thomas Dill,
By Geo. H. Lothrop.
*Attorney.*

UNITED STATES PATENT OFFICE.

THOMAS DILL, OF BAY CITY, ASSIGNOR TO JAMES CLEMENTS, OF ANN ARBOR, MICHIGAN.

EXCAVATING-MACHINE.

SPECIFICATION forming part of Reissued Letters Patent No. 9,568, dated February 15, 1881.

Original No. 227,222, dated May 4, 1880. Application for reissue filed January 13, 1881.

*To all whom it may concern:*

Be it known that I, THOMAS DILL, of Bay City, Michigan, have invented new and useful Improvements in Excavating-Machines, of which the following is a specification.

My invention relates to excavating-machines; and it consists, first, in the combination of the dipper, hinged upon the end of a sliding stock or handle, with a bell-crank lever, a connecting-rod between the bell-crank and the hinged dipper, and a slotted way or bearing adapted to cause the vibration of the bell-crank as the dipper-handle is reciprocated by the stroke of the piston, whereby the dipper will be tilted so as to present its cutting-edge to the earth, or the dipper be righted into position for dumping, according to the direction of the stroke of the piston; second, in the combination of the hinged dipper and sliding dipper-handle with a bell-crank lever mounted upon the dipper-handle, a connecting-rod between the bell-crank and the dipper, a piston with its rod attached to the dipper-handle for moving the same, and a casing formed upon the steam-cylinder and provided with a slotted way for vibrating the bell-crank lever, whereby the dipper-handle will be reciprocated by the stroke of the piston and the bell-crank lever simultaneously vibrated to tilt the dipper; third, in the combination of the sliding dipper-handle, bell-crank lever, and casing upon the steam-cylinder, the said casing being adapted to guide and support the sliding dipper-handle, and being also provided with a central longitudinal partition having a slot running in a horizontal plane a portion of its length, and then terminating in an inclined slot; fourth, in the combination of the mast with a shoe surrounding it at its base and having a partial bearing upon the mast, also an independent semi-cylindrical collar applied against the mast as a continuation of the bearing of the shoe, a screw-bolt being arranged to tighten up the parts, and the crane being rigidly secured to the shoe and hinged to the mast, whereby by loosening the screw the crane may be tilted; fifth, the combination of the crane, hinged to the mast and rigidly secured to an independent shoe, with proper means for tightening the bearing of the shoe against the mast; sixth, in the combination of the mast and the crane with a shoe having the peculiar conformation hereinafter specified; seventh, in the combination of a swinging crane with a steam-cylinder and piston swinging vertically upon trunnions journaled in the crane, the piston being connected with the sliding dipper-handle, so that the dipper-handle may be reciprocated by means of the steam-cylinder and piston, and the dipper may be raised without lifting the weight of the cylinder and piston.

Figure 2:
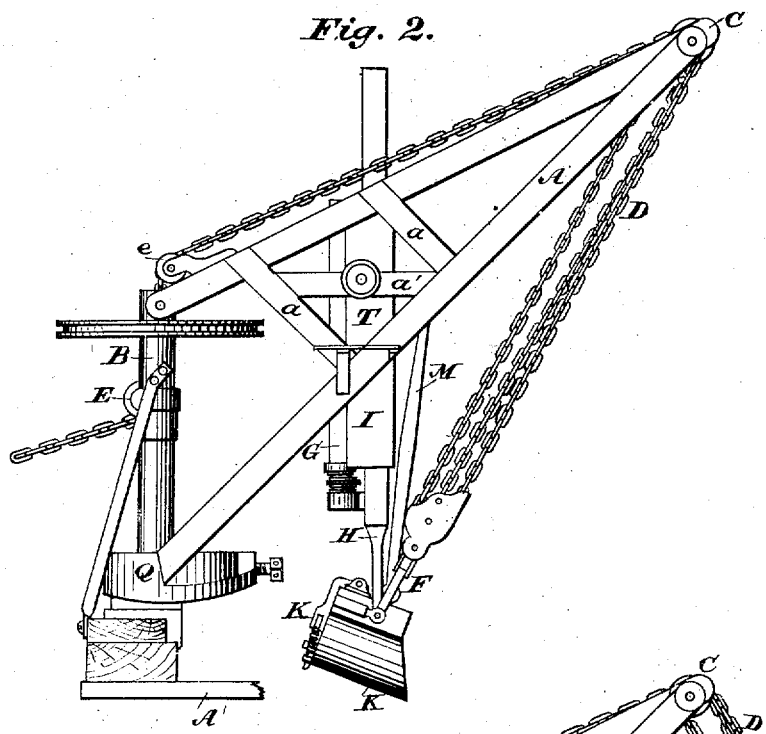
Figure 3:
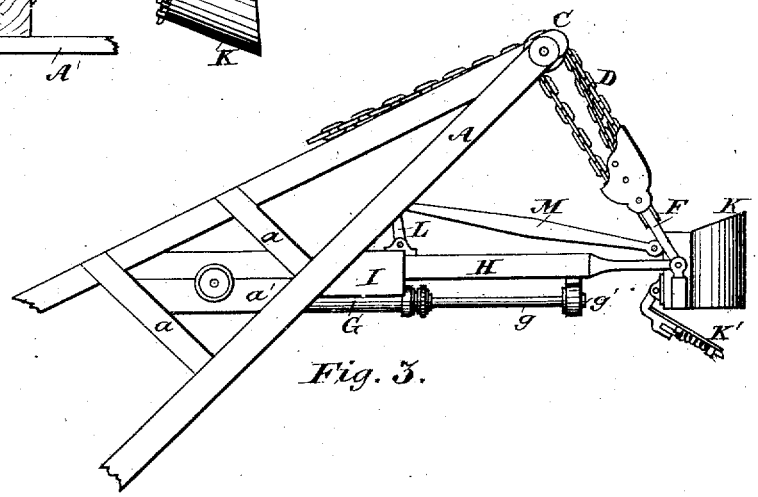
Figure 4:
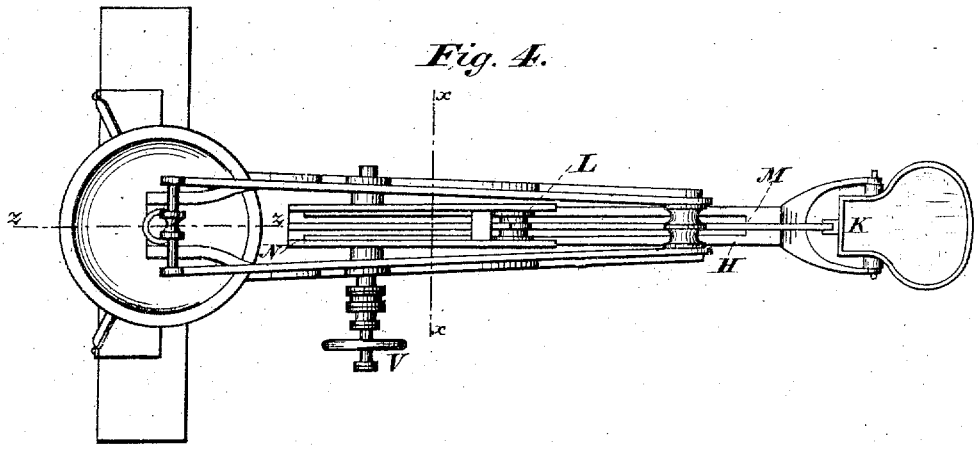
Figure 5:
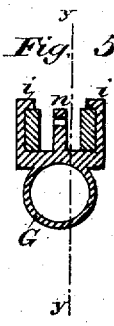
Figure 6:
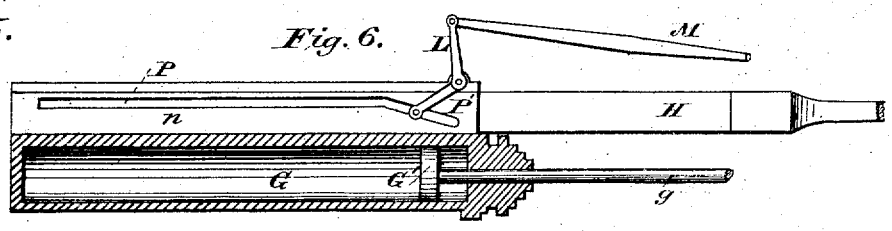
Figure 7:
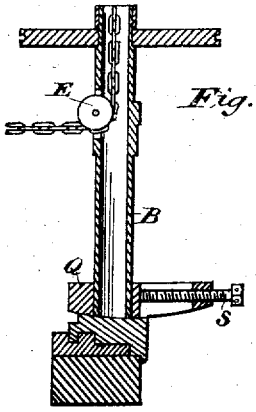
Figure 8:
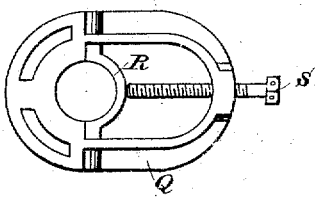

In the drawings, Figure 1 is a perspective view of my improved excavating-machine. Fig. 2 is a side elevation of the same, showing the dipper in position for cutting into the earth. Fig. 3 is a side elevation of a portion of my machine, showing the bucket hauled up by the tackle-chain and in a vertical position, with its door open for dumping. Fig. 4 is a top or plan view of the machine. Fig. 5 is a section on the line *x x*, Fig. 4. Fig. 6 is a section taken on the line *y y*, Fig. 5. Fig. 7 is a vertical central section, mainly of the mast and the shoe at its base. Fig. 8 is a detached view of the shoe and its adjuncts.

I will here premise that I propose employing, in connection with my improved machine, an engine as the source of power, together with appropriate mechanism for swinging the crane. As I claim, however, no novelty in either the engine or its attachments, I have deemed it unnecessary to herein illustrate the same.

The machine is provided with the usual stage or platform A′, upon which is mounted a hollow mast, B. The upper inclined timbers of the crane A are hinged to the mast-head, as at *b*, while the lower inclined timbers of the crane are secured at the base of the mast to a shoe, the functions of which will be presently described. The hollow mast B is so stepped that the crane A will swing freely laterally, as in ordinary dredges. The crane is properly strengthened by cross-bars *a a* and diagonal timbers or rods *a′*, and it is provided at its jib-head with the requisite double pulleys *c* for the tackle-chains D. The hauling-chain, which is wound upon a drum, (not herein shown,) enters the hollow mast under a pulley, E, and passes up and over a pulley, *e*, upon the crane near the mast-head, and thence to the double pulleys C at the jib-head and round the blocks, to which the dipper is suspended by a hinged yoke, F.

In carrying out that part of my invention which relates to means for actuating the dipper-handle and dipper I provide a steam-cylinder, G, with the usual auxiliaries for operating its piston G′, and support the said cylinder upon the crane by means of suitable trunnions, so that it shall be free to turn upon its bearings. The piston-rod *g* is connected at *g′* with the dipper-handle H, so that the latter will move simultaneously with the strokes of the piston. The dipper-handle H reciprocates in a casing, I, which is either cast with or secured upon the steam-cylinder. This casing, which is formed with ledges *i* overlapping the upper edges of the handle, serves both as a guide and a support for the same.

It will be seen by referring to Fig. 4 that the handle H is divided along that portion which works within the casing I, so that the two sides of such divided part will slide under the ledges *i* of the casing, as shown in Fig. 5.

The dipper K is journaled at the bifurcated front end of the handle H, and in order to tilt the dipper to the proper angle for presenting its cutting-edge to the earth and to right it into position for dumping, I employ a bell-crank lever, L, which, when vibrated about its axis, will tilt the dipper through the medium of a connecting-rod, M. This bell-crank lever is pivoted in suitable bearings upon the handle H, and is vibrated simultaneously with the reciprocations of the handle. As one practical way in which this bell crank-lever may be actuated, I form its lower arm of two prongs, which straddle a central longitudinal partition, *n*, in the casing I, and from the said prongs pass a pin through a slot, P, in the partition. This slot runs horizontally a portion of the length of the partition, and then inclines downwardly at the end nearest the dipper, as shown at P′, Fig. 6. When the handle H is retracted by the action of the steam against the piston the movement of the lower arm of the bell-crank lever in the slot will cause a vibration of the bell-crank lever, which, through the medium of the connecting-rod, will tip the dipper in position to cut when lowered, as shown in Fig. 2. The admission of steam to the inner end of the piston thrusts the dipper into the earth and fills it, when it may be raised by the tackle in the ordinary manner. When the piston reaches the outward end of its stroke the lower arm of the bell-crank lever is vibrated by the inclined portion of the slot P′ and tips the dipper into a vertical position for readily dumping its contents. This construction enables me to force the dipper into the earth to be excavated, and yet does not add the weight of the cylinder and piston to the load to be raised by the tackle-chain.

It is obvious that the piston may be actuated by water or compressed air without departing from my invention.

The dipper is provided with a hinged bottom, which may be opened and closed by the devices in ordinary use for that purpose.

The shoe or collar Q, to which the lower end of the crane A is secured, partially embraces and bears upon the lower end of the mast, and is slotted longitudinally forward of the center of the mast, as shown in Fig. 1, so as to permit the shoe to slide back of the mast when the crane is tilted, as hereinafter described. The remaining portion of that section of the mast which is not embraced by the said shoe or collar Q is embraced by a semi-cylindrical collar, R, which is held against the mast by means of a screw, S, which has its bearing in the collar Q.

By loosening the screw the crane may be tilted to a considerable extent, since its angle of inclination will only be limited by the check given to the collar R by the wall of the shoe at that side through which the screw enters. This tilting of the crane is exceedingly desirable when the excavating-machine is mounted upon a scow or car and being passed under a bridge.

Upon the crane is a platform, T, for an attendant to stand upon, so that he can control the valve V which regulates the admission of steam into the steam-cylinder.

The steam may be admitted from the boiler of the engine by any suitable flexible connection.

I do not claim, broadly, the application of a steam-cylinder directly to the dipper of an excavating-machine, as this has been done before; but

What I claim as my invention, and desire to secure by Letters Patent, is—

1. The combination, in an excavating-machine, of the hinged dipper with a sliding stock or handle, a bell-crank lever, connecting-rod, and a slotted guide-plate adapted to cause the vibration of the bell-crank lever as the dipper-handle is reciprocated, whereby the dipper will be tilted, substantially as herein specified.

2. The combination, in an excavating-machine, of the hinged dipper and sliding dipper-handle with a bell-crank lever on the dipper-handle, a connecting-rod between the bell-crank and the dipper, an actuating piston-rod, and a casing formed upon the steam-cylinder and provided with a slotted guide-plate for vibrating the bell-crank lever, whereby the dipper-handle will be reciprocated by the stroke of the piston and the bell-crank lever vibrated to tilt the dipper, substantially as herein set forth.

3. The combination, in an excavating-machine, of the dipper and sliding dipper-handle with a bell-crank lever and a casing upon a steam-cylinder, the said casing being adapted to guide and support the dipper-handle, and being also provided with a central longitudinal plate or partition having a guide-slot running in a horizontal plane a portion of its length, and then terminating in an inclined slot, substantially as and for the purpose specified.

4. The combination, in an excavating-machine, of the mast with a shoe surrounding its base and having a partial bearing thereon, an independent semi-cylindrical collar applied against the mast as a continuation of the bearing of the shoe, a screw-bolt to tighten up the parts, and a crane rigidly secured to the shoe and hinged to the mast, whereby by loosening the screw the crane may be tilted, substantially as set forth.

5. The combination, in an excavating-machine, of a crane, hinged to the mast and rigidly secured to an independent shoe, with device for tightening the bearing of the shoe against the mast, substantially as specified.

6. The combination, in an excavating-machine, of the mast and crane with a shoe, Q, formed with a half-cylindrical bearing and an enlarged space to admit of a longitudinal movement of the shoe, as and for the purposes herein specified.

7. In an excavating-machine, the combination of a swinging crane, a steam-cylinder swinging on trunnions journaled in the crane, and a dipper connected with the piston-rod of the steam-cylinder, substantially as and for the purposes herein specified.

8. In an excavating-machine, the combination of a swinging crane, a steam-cylinder swinging on trunnions journaled in the crane and having its piston-rod connected with the dipper-handle, and a sliding dipper-handle, substantially as and for the purposes herein specified.

THOMAS DILL.

Witnesses:
WM. H. WELLS,
GEO. B. REMICK.